US006478423B1

(12) United States Patent
Turner et al.

(10) Patent No.: US 6,478,423 B1
(45) Date of Patent: Nov. 12, 2002

(54) CONTACT LENS COATING SELECTION AND MANUFACTURING PROCESS

(75) Inventors: David C. Turner, Jacksonville; John C. Heaton, Atlantic Beach; Douglas G. Vanderlaan, Jacksonville; Robert B. Steffen, Jacksonville Beach; Joe M. Wood, Jacksonville; Lenora L. Copper, Jacksonville; James S. Jen, Jacksonville, all of FL (US)

(73) Assignee: Johnson & Johnson Vison Care, Inc., Jacksonville, FL (US)

( * ) Notice: Subject to any disclaimer, the term of this patent is extended or adjusted under 35 U.S.C. 154(b) by 25 days.

(21) Appl. No.: 09/663,437

(22) Filed: Sep. 16, 2000

Related U.S. Application Data

(63) Continuation-in-part of application No. 09/417,196, filed on Oct. 12, 1999.

(51) Int. Cl.$^7$ .................................................. G02C 7/04
(52) U.S. Cl. ................................... 351/177; 351/160 H
(58) Field of Search ........................ 351/160 H, 160 R, 351/161, 177

(56) References Cited

U.S. PATENT DOCUMENTS

| | | |
|---|---|---|
| 4,143,949 A | 3/1979 | Chen |
| 4,217,038 A | 8/1980 | Letter et al. |
| 4,280,970 A | 7/1981 | Kesting |
| 4,293,642 A | 10/1981 | Beavan et al. |
| 4,312,575 A | 1/1982 | Peyman et al. |
| 4,379,893 A | 4/1983 | O'Malley et al. |
| 4,462,665 A | 7/1984 | Shah |
| 4,546,123 A | 10/1985 | Schafer et al. |
| 4,734,475 A | 3/1988 | Goldenberg et al. |
| 4,892,402 A | 1/1990 | Sawamoto et al. |
| 4,895,896 A | 1/1990 | Muller-Lierheim |
| 4,920,184 A | 4/1990 | Schafer et al. |
| 4,959,074 A | 9/1990 | Halpern et al. |
| 4,973,493 A | 11/1990 | Guire |
| 4,979,959 A | 12/1990 | Guire |
| 5,002,582 A | 3/1991 | Guire et al. |
| 5,108,776 A | 4/1992 | Golberg et al. |
| 5,135,297 A | 8/1992 | Valint, Jr. |
| 5,135,516 A | 8/1992 | Sahatjian et al. |
| 5,217,492 A | 6/1993 | Guire et al. |
| 5,263,992 A | 11/1993 | Guire |
| 5,275,838 A | 1/1994 | Merrill |
| 5,350,800 A | 9/1994 | Verhoeven et al. |
| 5,364,918 A | 11/1994 | Valint, Jr. et al. |
| 5,397,848 A | 3/1995 | Yang et al. |
| 5,408,280 A | 4/1995 | von der Haegen et al. |
| 5,409,731 A | 4/1995 | Nakagawa et al. |
| 5,422,402 A | 6/1995 | Bowers et al. |
| 5,426,158 A | 6/1995 | Mueller et al. |
| 5,480,946 A | 1/1996 | Mueller et al. |
| 5,525,691 A | 6/1996 | Valint, Jr. et al. |
| 5,578,675 A | 11/1996 | Mormile et al. |
| 5,584,882 A | 12/1996 | Yabushita et al. |
| 5,670,558 A | 9/1997 | Onishi et al. |
| 5,708,050 A | 1/1998 | Nakada et al. |
| 5,711,823 A | 1/1998 | Ellis et al. |
| 5,779,943 A | 7/1998 | Enns et al. |
| 5,805,264 A | 9/1998 | Janssen et al. |
| 5,858,653 A | 1/1999 | Duran et al. |
| 5,910,518 A | 6/1999 | Nakada et al. |
| 6,087,415 A | 7/2000 | Vanderlaan et al. |
| 6,265,509 B1 | 7/2001 | Muller |

FOREIGN PATENT DOCUMENTS

| | | |
|---|---|---|
| EP | 0 321 403 B1 | 6/1989 |
| EP | 0 362 137 A2 | 4/1990 |
| EP | 0 393 532 B1 | 10/1990 |
| EP | 0 574 352 A1 | 12/1993 |
| EP | 0 374 752 B1 | 1/1995 |
| EP | 0 713 106 A1 | 5/1996 |
| EP | 0 728 487 A1 | 8/1996 |
| EP | 0 747 071 A1 | 12/1996 |
| EP | 0 751 407 A2 | 1/1997 |
| EP | 0 758 687 A1 | 2/1997 |
| EP | 0 643 083 B1 | 5/1997 |
| EP | 0 814 116 A1 | 12/1997 |
| EP | 0 655 470 B1 | 5/1999 |
| EP | 655 470 B1 | 5/1999 |
| EP | 0 963 761 A1 | 12/1999 |
| WO | WO 89/09246 | 10/1989 |
| WO | WO 91/04283 | 4/1991 |
| WO | WO 92/09639 A2 | 6/1992 |
| WO | WO 92/09650 A1 | 6/1992 |
| WO | WO 98/00391 A1 | 1/1993 |
| WO | WO 94/06485 A1 | 3/1994 |
| WO | WO 95/04609 A1 | 2/1995 |
| WO | WO 96/24392 A1 | 8/1996 |
| WO | WO 97/18904 A1 | 5/1997 |
| WO | WO 97/29160 | 8/1997 |
| WO | WO 98/33089 A1 | 1/1998 |
| WO | WO 99/15917 A1 | 4/1999 |
| WO | WO 99/57178 A1 | 11/1999 |

OTHER PUBLICATIONS

Gonjo et al., "Dope for Forming Soft Contact Lenses", Patent Abstracts of Japan, Publication No. 54043284 A, Date of Publication Apr. 5, 1979.

Kono et al., "Contact Lenses", Patent Abstracts of Japan, Publication No. 62094819 A, Date of Publication May 1, 1987.

Aoyama et al., "Contact Lens and Its Production", Patent Abstracts of Japan, Publication No. 06289332 A, Date of Publication Oct. 18, 1994.

Ushiyama et al., "Contact Lens", Patent Abstracts of Japan, Publication No. 05080276 A, Date of Publication Apr. 2, 1993.

Masaaki, T., "Method for Applying Hard Coat", Patent Abstracts of Japan, Publication No. 05019103, Date of Publication Jan. 26, 1993.

U.S. patent application Ser. No. 09/417,196, Johnson et al., pending.

U.S. patent application Ser. No. 09/328,628, Johnson et al., pending.

PCT Search Report dated Feb. 20, 2001 for International Application No. PCT/US 00/28092.

*Primary Examiner*—Scott J. Sugarman
(74) *Attorney, Agent, or Firm*—Todd Volyn

(57) ABSTRACT

The invention is a method of making a coated contact lens with desirable physiological performance. Preferably, the lenses are made from hydrophobic contact lens substrate with a hydrophilic coating material. The hydrophobic lens substrate is coated with a hydrophilic material having an expansion factor greater than one. The coated lenses have low physical defect and surface roughness profiles.

27 Claims, No Drawings

CONTACT LENS COATING SELECTION AND MANUFACTURING PROCESS

Related Application Information

This application is a Continuation-in-part of U.S. Ser. No. 09/417,196, filed Oct. 12, 1999 (now abandoned).

BACKGROUND OF THE INVENTION

This invention relates to contact lenses. More particularly, it relates to contact lens substrate s made of one material and coated with another and methods for selecting and preparing such combinations to achieve good physiological performance of the coated lenses.

Coating a substrate of one material with a different material has been proposed as a strategy for making contact lenses for a variety of reasons. The coating may offer a property or properties that are different from those of the substrate and which are particularly desirable as a lens surface apart from the bulk properties of the lens material itself. Properties such as wettability, resistance to proteinaceous deposits, biocompatability, UV shielding and other desirable lens characteristics and properties could conceivably be addressed with this approach.

U.S. Pat. No. 5,779,943, for example, proposes preparing a molded article such as a contact lens by coating a bulk polymer with a latent hydrophilic material in the mold. The molded article is made more wettable at its surface. WO 96/24392 to Morra, et al., proposes coating a substrate with hyaluronic acid to improve biocompatability. One proposed use for the coated substrate is in intraocular lenses. WO 94/06485 proposes coating a hydrophobic substrate with a carbohydrate to make the device from which it is made more wettable at its surface. WO 93/00391 proposes coating a hydrogel with a hydrophilic coating polymer to make the substrate more hydrophilic and less prone to adhesion by tear proteins. U.S. Pat. No. 5,708,050 proposes coating a lens substrate with a silicone oil, a polysaccharide, or a denatured collagen to make it more hydrophilic at its surface. Beyond a general recognition that wettability and oxygen permeability are desirable lens characteristics, little insight has been provided on substrate/coating selection and application criteria for physiological compatibility. That is, there has been little guidance available for determining substrate and coating materials and application conditions that will provide good physiological performance.

Simply coating a lens substrate made from hydrophobic monomers with a hydrophilic coating material without accounting for such critical parameters will not alleviate the problems such as dryness and surface deposition described above. It has not been possible to predict the success of a given lens/coating combination or coating process until lenses made from the material were placed in actual physiological conditions. Thus, materials that have appeared to provide favorable properties have often manifested the negative conditions described above only when actually placed in contact with a wearer's eye. This has left the selection of suitable coated contact lens materials and coating methods largely an empirical art with little ability to predict even the physiological effect of lot to lot variations in contact lens manufacturing processes.

Polymers made from silicones and other hydrophobic materials (e.g., polyfluorinated polymers and polypropylene glycol) used as contact lens materials present particular challenges that might be addressed with coating processes. The oxygen permeability of such lens materials can be very high making them desirable in many instances. However, the surfaces of such materials typically do not provide desirable levels of wettability. This, among other properties of lenses made from hydrophobic materials can result in dryness, grittiness, and general discomfort. The surfaces of such polymers also tend to have an affinity for certain tear components such as proteins, lipids and mucin. This can result in increased surface deposition and fouling with opaque deposits when worn. Such lenses can also become tightly adhered to the cornea, potentially leading to serious damage to the corneal epithelium. Plasma coating processes, aqueous and organic coating processes, and surface derivitization have all been described as potential methods for coating the hydrophobic lens material or changing its wettability at the surface.

The field of contact lens production could benefit greatly from a predictive method for selection and production of materials without undue reliance on testing in physiological conditions. While one cannot eliminate such testing, better predictive models will streamline materials selection processes by reducing the number of different options to be tested. They would also provide a means for distinguishing useful and beneficial materials combinations and lenses from materials combinations and lenses that are not so useful or beneficial during manufacturing and testing of lenses.

BRIEF SUMMARY OF THE INVENTION

The invention is a process for coating a contact lens substrate with another material to achieve desirable physiological performance. In one aspect of the invention, the substrate is coated with coating that will have a surface area expansion factor greater than one. The coated lenses have low physical defect and low surface roughness. Preferably, they have a sub-micron coating thickness.

In another aspect of the invention, a lens substrate made from hydrophobic monomers is coated with a hydrophilic material having a surface area expansion factor greater than one.

In yet another aspect of the invention, a method of coating a contact lens comprises selecting a lens substrate material, selecting a coating material which will have a surface area expansion factor greater than one relative to the lens substrate material, coating the lens substrate material with the coating material, and forming and selecting coated lenses having low physical defect and surface roughness profiles.

DETAILED DESCRIPTION OF THE INVENTION

Good physiological performance is obtained in coated lenses made according to this invention. For the purposes of this specification, good physiological performance or physiological compatibility is marked by a lens which when in contact with the eye results in good clinical comfort (average comfort>40 on 50 point subjective scale), good wettability (non-invasive tear break up time (NIBUT)>5 sec), minimal corneal disruption (average maximum type corneal staining≦1), and minimal on-eye lens spoiling (average deposits≦slight). A lens that meets these criteria is a physiologically compatible contact lens as the term is used throughout this specification.

Virtually any substrate that can be fashioned into a contact lens can be used in this invention provided it is optically transparent and is oxygen permeable. Suitable substrates include polymers made from hydrophobic materials such as silicone copolymers, interpolymers, oligomers, and macromers. Illustrative polysilicones are polydimethyl siloxane, polydimethyl-co-vinylmethylsiloxane. Other silicones are the silicone rubbers described in U.S. Pat. No. 3,228,741 of Becker issued Jan. 11, 1966; blends such as those described in U.S. Pat. No. 3,341,490 of Burdick et al., issued Sep. 12, 1967 and silicone compositions such as described in U.S. Pat. No. 3,518,324 of Polmanteer, issued Jun. 30, 1970. Substrates described in U.S. Pat. Nos. 4,136,250; 5,387,623; 5,760,100; 5,789,461; 5,776,999; 5,849,811; 5,314,960 and 5244,981 are also particularly suitable for use in this invention. Cross-linked polymers of propoxylate of methyl glucose and propylene oxide and HEMA-based hydrogels are different classes of substrates amenable to the process of this invention.

Preferred silicone compositions useful in forming the substrate of this invention are the cross-linked polysiloxanes obtained by cross-linking siloxane prepolymers by means of hydrosilylation, co-condensation and by free radical mechanisms such those described by Chen in U.S. Pat. No. 4,143,949 which is incorporated herein by reference. More preferred silicone-based substrates are cross-linked polymers of α,ω-bisamionpropyl polydimethylsiloxane, and gylycidyl methacrylate, cross-linked polymers. The particularly preferred substrates are silicone compositions that are made from combining a methacrylate one or more silicone monomers in the presence of a Group Transfer Polymerization catalyst to form a macromer that is subsequently polymerized with other monomers to give the final substrate. Initiators, reaction conditions, monomers, and catalysts that can be used to make GTP polymers are described in "Group Transfer Polymerization" by O. W. Webster, in Encyclopedia of Polymer Science and Engineering Ed. (John Wiley & Sons) p. 580, 1987.

The coating selected must be capable first of adhering to the substrate. This can be via chemical bonding such as covalent or ionic bonding or it can be via physical attraction so long as the coating can be made to adhere to the substrate. That is, the coating must be capable of remaining affixed to the lens substrate throughout its useful life (storage time plus the time in which it will be in contact with a user's eye). It is also possible to use more than one layer of coating. This is particularly desirable where the coating layer will provide the requisite surface properties (as described more fully below) but is not particularly compatible with the substrate by itself. For example, a tielayer or coupling agent can be used to adhere the hydrophilic coating to the substrate. A coating layer with a significant number of carbonyl groups could be bonded to a polyolefin substrate through the use of a diamine tielayer in such a scheme. Selections of compatible lens substrate, coating, and tielayer (if necessary) materials is well within the knowledge of one skilled in the art.

Mere adhesion is not enough to produce the coated lenses of this invention. The coating material must be one that will exhibit a surface area expansion factor greater than one relative to the lens substrate. The coating surface area expansion factor, as the term is used throughout this specification, is the fractional expansion of the coated lens surface area due to the coating as the lens goes from the coating condition to the final physiological saline solution. The expansion factor is arrived at by measuring the increase in surface area of the lens as a result of the coating when taken from the coating condition to a physiological buffer. In practice this can be directly measured by determining the fractional increase in surface area due to the coating using atomic force microscopy (AFM). For example, the true surface area in an arbitrary AFM scan area can be determined for the coated article (under physiological conditions) and the uncoated article under coating conditions. The ratio of these measurements is defined as the coating expansion factor. Using a 20×20 $\mu$m scan area we might find that the true coated surface area is 412 $\mu m^2$, while the true surface area of the uncoated lens is 400.8 $\mu m^2$. The surface area expansion factor ratio of the coating is 1.0279.

Parameters such as pH, temperature, ionic strength, and dielectric constant of the coating solution can all be used to select and combine materials which will display the proper relative expansion condition of the substrate and coating in a particular set of conditions (within certain ranges dependent upon the materials considered). For example, ionic coating polymers (and/or lenses) can change volume dramatically with pH. Thus a pH can be chosen to shrink the coating relative to the substrate during the coating process.

Alternatively, the coating conditions can be arranged such that the lens substrate is highly swollen. This can often be controlled using temperature or by changing the dielectric constant of the coating solution. Organic solvents can be particularly useful for silicone hydrogel lens substrates where the lenses often swell by a factor of two or three in solvents such as isopropanol, ethanol, acetonitrile, tetrahydrofuran. Very hydrophilic coatings will not swell so dramatically under those conditions. Also, it is possible to apply the coating to a hydrated lens as a solid, low water content paste. Combinations giving an expansion factor greater than 1.00 are preferred with combinations giving expansion factors greater than 1.01 being most preferred. Acceptable coatings can have expansion factors greater than 1.03 and still be within the scope of the invention. However, coatings cannot be used where such a high surface expansion factor contributes to surface roughness beyond that described as acceptable in this specification.

Combinations of coating materials and lens substrate materials that will result in an expansion factor greater than one include, for example, non-ionic silicone hydrogel substrates with water content between 20 and 50% and anionic coating polymers such as polyacrylic acid ("PAA"), poly (methacrylic acid), poly(itaconic acid), poly(maleic acid), poly(sulfopropyl methacrylate sodium salt) and block or random copolymers of those acid monomers (coating done at low pH). Also, non-ionic silicone hydrogel lenses with non-ionic polymer coatings such as: polyacrylamide, polydimethacrylamide, polyvinylalcohol, cellulose, dextran, polyethylene oxide.

The coatings are applied at the submicron level (between about 0.1 nm and 500 nm thick). They are prepared and applied as aqueous solutions, suspensions, or colloids and then applied to the substrate according to any process that will put the coating in uniform contact with the substrate. For example, immersion, spraying, brushing, and spin coating are all useful application techniques. Immersion and spraying are the preferred processes since proper thickness and uniformity of the coating are most easily accomplished with them. In the most preferred embodiment, coating thickness at the submicron level is achieved by preparing a dilute polymer solution of coating material such as a solution between about 0.1 and 6.0 wt % of PAA. A silicon-based polymer substrate is then immersed in it for between 1 min and 120 minutes at temperatures of 5–80° C. followed by a five step rinse over approximately 30 min in which the unreacted polymer is washed away using a buffered saline solution.

The process must also leave the coating with a low physical defect profile. A low physical defect profile, as the term is used throughout this specification, means that once coated, the coating layer has no physical defects such as holes or tears that are greater than 4.6 µm across along the longest dimension of the defect. Holes or tears less than 4.0 µm are preferred with those less than 0.5 µm most preferred. This parameter can be met by applying the coating under conditions sufficient to reach confluence and by ensuring that all parts of the lens substrate are exposed to essentially equivalent coating conditions. For example, the process must require that the coating material itself and all activation elements (e.g., crosslinkers, catalysts, and initiator) are uniformly distributed when averaged over time. Processes that require contact between a tool, mold piece or the like and a portion of the lens during coating will not generally meet this criteria. Solution coating processes in which the lens substrate is freely floating and the coating solution is isotropic and not diffusion limited are most preferred. Additionally, no debris or dust should attach to the lens, so that a homogenous surface is formed to which the coating may adhere defect free. This surface homogeneity requirement also means that any phase separation (domains) on the lens must be smaller than 4.6 µm in dimension. In the aspect of this invention that involves the selection of coating materials, this criteria will preclude the use of polymers known to form voids or spherulites greater than 4.6 µm.

In the aspect of the invention in which coated substrates meeting this requirement are selected for use and those not meeting this criteria are discarded, any method for detecting surface defects of this size can be employed. Such methods can include, for example, Atomic Force Microscopy (AFM), stylus and optical profilometry, and electron microscopy including Scanning Electron Microscopy.

In addition to providing the coated lens substrate with a low defect profile, the process must also imbue the coated substrate with a low surface roughness profile. A low surface roughness profile, as the term is used throughout this specification, is a peak to peak surface roughness of less than 475 nm over any 10×10 µm area on the surface of the coated lens substrate. Peak to peak roughness is defined as the difference between the highest peak and lowest valley in a 10×10 µm image area. This criteria is met by ensuring smooth molds and smooth uncoated lens substrates as well as controlling the amount of coating applied to the lens (as described above) so that it does not create excessive roughness of the surface. U.S. Pat. Nos. 4,565,348 and 4,640,489 describe methods of making molds meeting these requirements. Both patents are incorporated herein by reference.

In the aspect of the invention in which coated substrates meeting this requirement are selected for use and those not meeting this criteria are discarded, any method for detecting surface roughness of this magnitude can be employed. Such methods can include, for example, AFM, light scattering such as that performed with the Goniometric Optical Scattering Instrument (GOSI), direct optical microscopy, and environmental scanning electron microscopy. Methods amenable to automated inspection systems during manufacture are preferred. The optical microscopy method is preferred in a manufacturing setting if the optical microscopy is capable of observing the coating uniformity. This method can be readily automated so that coated lens substrates can be automatically inspected and selected for use or discarded based on a programmed command using the selection criteria for surface roughness described above.

The aspect of the invention in which coated substrates having coatings with a surface area expansion factor greater than one (relative to the lens substrate), the coating has a low defect profile, and a low surface roughness profile are selected for use and those not meeting this criteria are discarded, the process is conducted as follows.

A lens substrate and coating combination are selected as described above. A lens substrate is formed from the material selected for its use using any known method for forming such substrates. The process described in U.S. Pat. No. 4,245,069 (incorporated herein by reference) is suitable for this purpose. The lens substrate is then coated with the coating matched to substrate material so that it will have a surface area expansion factor greater than 1 as described above. It is preferred that the coating is adhered to the substrate by contacting an aqueous solution of the coating to the substrate such that the coating is bonded. Covalent bonding is preferred. Once the lens substrate is coated it may be subjected to any number of additional steps that are conducted in the manufacture of contact lenses. These can include, for example, swelling and washing steps, the addition of additives such as surfactants, extraction steps and the like.

At a point after the coating is adhered to the lens substrate and preferably after any intermediate steps just described, the lens can be subjected to inspection for physical defect profile, roughness profile, or both. This can be facilitated and automated by preparing the coating with a stain, preferably before coating the substrate with the coating material. Those lenses found to meet the selection criteria proceed to packaging for commercial distribution and those that do not are discarded (i.e., not further processed for commercial distribution).

Alternatively, one can take a statistical approach to the selection process. This is done by identifying a statistically relevant population of lens within a prescribed unitary portion of the lenses produced (e.g., a commercial lot) and analyzing a number of lenses sufficiently representative of the population so that one can be sufficiently confident that all members of the population have the prescribed physical defect and surface roughness profiles. Those populations having such criteria are then selected for commercial use. Those populations for which such confidence cannot be displayed are either discarded or subjected to further evaluation to determine whether some portion thereof can be selected for commercial use. When this alternative is used, a confidence level of 83% for surface roughness and/or physical defect profile is required. A confidence level of at least 98% is preferred.

The invention will be further described by the following nonlimiting examples.

EXAMPLES

Example 1

Substrate Formation 12.5 g KOH were added to 350 g of 20 mole propoxylate of methyl glucose, available from Americol Corp., Edison, N. J. as GLUCAM™ P-20, in a high temperature/pressure reactor. The mixture was heated to 105° C., stirred for 30 minutes with nitrogen sparging, and then pulling vacuum. After repeating the sparge/vacuum two more times, the pressure was allowed to rise to 10 psi and the temperature increased to 125° C. 1922 g propylene oxide were added gradually over 7 hours while maintaining a pressure of 30–40 psi and a temperature of 135° C. After continuing agitation overnight, 947 g ethylene oxide were added following a similar procedure. The product was neutralized with 9.1 g phosphoric acid and filtered with dicalite to give a slightly hazy liquid with a hydroxyl number of 28.3 mg KOH/g.

To a solution of 200 g of this product, 21.0 g triethylamine and 342 mg N,N-dimethylaminopyridine in 600 g dry ethylene glycol dimethyl ether at 40° C. were added 32.1 g of methacrylic anhydride in 250 g ethylene glycol dimethyl ether dropwise to the reaction flask over a 7 to 8 hour period. The reaction was continued at 40° C. for 7 days.

The reaction temperature was decreased to 25° C. and 100 ml deionized water were added. The pH of the reaction mixture was adjusted to 7.0 using a 5% aqueous hydrochloric acid solution. 600 g of AMBERLITE™ IRA 96 were added and the mixture stirred for one and one half hours. The AMBERLITE™ IRA 96 was removed by filtration and the mixture volatilized at 30 to 35° C. under reduced pressure. Approximately 1 L chloroform was added and the resulting liquid was washed with an equal volume of 5% aqueous solution of sodium bicarbonate twice and with saturated sodium chloride once. The organic layer was passed through a 400 g silica bed. 100 mg of 4-methoxyphenol were added and the chloroform removed under pressure. Approximately 75 ml methanol were added and then removed under reduced pressure to remove residual chloroform and yield a macromer.

A blend was made of 11.2 wt % of the macromer, 40 wt % TRIS, 28 wt % DMA, 0.8 wt % DAROCUR™ 1173, and 20 wt % 1-hexanol. The blend was cured in contact lens molds by exposure to UV light for 30 minutes. The molds were opened and the lenses released into a blend of isopropanol and water, rinsed with isopropanol, and placed in borate-buffered saline.

Example 2

Substrate Formation

Silicone-containing contact lenses were prepared according to the following procedure. 500 g of α,ω-bisaminopropyl polydimethylsiloxane (5000 MW) and 68 g of glycidyl methacrylate were combined and heated with stirring at 100° C. for 10 hours. The product was extracted five times with 1500 ml of acetonitrile to remove residual glycidyl methacrylate to give a clear oil.

A blend of 25.35 wt percent of this reaction product, 25.35 wt percent 3-methacryloxypropylbis(trimethylsiloxy) methylsilane, 27.3 wt percent N,N-dimethylacrylamide, 0.31 wt percent 2-hydroxy-2-methyl-1-phenyl-propan-1-one available as DAROCUR™ 1173, 13.2 wt percent 3-methyl-3-pentanol, and 8.8 wt percent octamethylcyclotetrasiloxane was cured in a contact lens molds using UV light. The molds were opened and lenses released into isopropanol and then transferred into a borate-buffered solution.

Example 3

Coating Selection and Application
Preparation of the substrate
To a solution of 13.75 ml of a 1M solution of TBACB in THF, 30.0 g bis(dimethylamino)methylsilane, 61.39 g p-xylene, 154.28 g methyl methacrylate, and 1892.13 g 2-(trimethylsiloxy)ethyl methacrylate in 4399.78 g THF at 14° C., under a $N_2$ atmosphere, was added 191.75 g of 1-trimethylsiloxy-1-methoxy-2-methylpropene. 30 ml of additional TBACB in THF (0.40 M) was added over a period of 260 minutes, during which time the reaction mixture was allowed to exotherm, and then cooled to 30° C. Sixty minutes after addition of 2-(trimethylsiloxy)ethyl methacrylate, a solution of 467.56 g 2-(trimethylsiloxy)ethyl methacrylate, 3636.6 g mPDMS and 3673.84 g TRIS and 20.0 g bis(dimethylamino)methylsilane was added, and the mixture was allowed to exotherm and then cooled to 30° C.

for 2 hours. A solution of 10.0 g bis(dimethylamino) methylsilane, 154.26 g methyl methacrylate, and 1892.13 g 2-(trimethylsiloxy)ethyl methacrylate was then added and the mixture was again allowed to exotherm. After 2 hours, 2 gallons of anhydrous THF was added, followed by a solution of 439.69 g water, 740.6 g methanol and 8.8 g dichloroacetic acid after the solution was allowed to cool down to 34° C. The mixture was refluxed for 4.5 hours, heating with an oil bath at 110° C., and volatiles were distilled off at 135° C., with addition of toluene to aid in removal of water, until a vapor temperature of 110° C. is reached.

The reaction flask was cooled to 110° C., and a solution of 443 g TMI and 5.7 g dibutyltin dilaurate was added. The mixture was reacted for 3.5 hours, then cooled to 30° C. The toluene was evaporated under reduced pressure to yield off-white, anhydrous, waxy, reactive macromer. The theoretical OH content of the macromer is 1.69 mmol/g.

The polymer was made from a mix of about 20%wt macromer, 28.5%wt monomethacryloxy polydimethyl siloxane, 26%wt DMA, and remainder additives, diluent, and crosslinkers. A coating would thus have to be selected which was hydrophilic, chemically compatible with the lens substrate, and which would achieve a relative expansion factor greater than 1. Poly(acrylic acid) (PAA) was thus selected for use as the hydrophilic coating. The lens was coated with poly(acrylic acid) (Mw=250 kD) using the following conditions:

1. Lenses were dispersed in a 3% (w/w) aqueous solution of PAA [0.35% in water (w/w), 250,000 ave MW, CAS# 9003-01-4] @ 3 ml/lens
2. EDC ([1-(3-dimethylaminopropyl)-3-ethyl-carbodiimide, 98+%, CAS# 25952-53-8]) was added as a powder to a concentration of 0.3% (w/w)
3. Reaction was carried out in a bottle at 21° C. for 1 hr. The pH was less than 4.0.
4. Lenses rinsed by 4 exchanges with borate buffered saline solution.
5. Lenses were vialed and steam sterilized.

A coated contact lens having approximately 0.1 $\mu g/cm^2$ of PAA was the result.

AFM analysis of the coated lens surface was then conducted using a Digital Instruments Dimension 3100 AFM. Images were acquired with contact mode AFM using a 0.06 N/m $SiN_4$ cantilever imaging in packing solution. Imaging force was minimized before data was acquired and was typically<10 nN. Images were 20×20 $\mu m$ areas, within the optical zone, on the anterior and posterior surface of each lens. Three lenses were evaluated for a total of nine 20×20 $\mu m$ images on each side. Root mean square (RMS) and peak to peak roughness values were calculated using 36 10×10 $\mu m$ areas from each side of the lens. Dramatic folds were observed on the surface. These folds are indicative of the swelling of the coating relative to the underlying substrate. The coating surface area expansion factor was calculated as described above by comparing the actual surface area of the coated article with the corresponding surface area of the uncoated lens. Note that the surface of the uncoated lens was shown to be unaffected by pH so both measurements were carried out at pH 7.2. The resulting expansion factor was determined to be 1.043. In addition, the coating surface exhibited a mean RMS (root mean square) surface roughness of 25.2±11.2 nm and there were no coating defects (uncoated areas) observed greater than 4 $\mu m$.

Clinical studies were carried out for the coated lenses described herein. The clinical studies were conducted as a 30 minute contralateral of the PAA coated lens against the uncoated lens (N=10 eyes). The coated lens was wettable on eye with good clinical performance over the 30 minute trial. The coated lens was more wettable, had a lower incidence of corneal epithelium disruption and reduced discrete deposition compared to the uncoated substrate. No discrete deposits greater than slight were observed on the coated lens while the uncoated lens had an incidence of mild deposition.

This example shows that the coating with a swelling ratio greater than one was able to reduce the discrete surface deposition to mild or less in this study, while maintaining good wettability of the lens on the eye.

Example 4

Coating Selection and Application

A lens substrate was prepared from a polymer of crosslinked GTP macromer of the type described in Example 3 and polydimethyl siloxane. The polymer was made from a monomer and additive mix comprising about 18%wt macromer, 21%wt polydimethyl siloxane, 21%wt. TRIS, 25.5%wt DMA, and remainder additives, diluent, and crosslinkers. The lens was coated with poly(acrylic acid) PAA by the method described in Example 3. A coated contact lens having approximately 0.1 $\mu g/cm^2$ of PAA per unit area on the surface of the lens was the result. AFM analysis of the coated lens surface was then conducted as described in Example 3. Again, folds were observed on the surface. These folds are indicative of the swelling of the coating relative to the underlying substrate. The coating surface area expansion factor was calculated as described above. Again, since the lens surface was shown to be unaffected by pH both measurements were carried out at pH 7.2. For these lenses, this expansion factor was found to be 1.013. The coating surface exhibited a mean RMS (root mean square) surface roughness of 13.3±6.3 nm and there were no coating defects (uncoated areas) observed greater than 4 $\mu$m.

A clinical study was carried out on these coated lenses. The study was a one week contralateral with ACUVUE® lenses (Etafilcon A—based uncoated hydrogel lenses available from Johnson & Johnson, Inc.) as the predicate lens. The clinical findings indicate that the PAA coated lens was statistically identical to ACUVUE® lenses in the areas of comfort, grittiness, dryness, wettability, and discrete deposits over the one-week study.

This example indicates that a PAA coated lens with an expansion factor of greater than 1.01 has reached a level of performance similar to that of a commercially available conventional hydrogel lens with respect to wettability, deposit resistance and ocular physiology.

Example 5

Coating Selection and Application

A lens substrate was prepared from a polymer of crosslinked GTP macromer of the type described in Examples 3 and 4 and polydimethyl siloxane. The polymer was made from a monomer and additive mix comprising about 18%wt macromer, 28% wt monomethacryloxy polydimethyl siloxane, 14%wt. TRIS, 26%wt DMA, 1% wt TEGDMA, 5% wt HEMA, 5% wt PVP and remainder additives, diluent, and crosslinkers. The lens was coated with poly(acrylic acid) PAA by the method described in Example 3. A coated contact lens having approximately 0.2 $\mu g/cm^2$ of PAA per unit area on the lens was the result. AFM analysis of the coated lens surface was then conducted as described above. Again, folds were observed on the surface. These folds are indicative of the swelling of the coating relative to the underlying substrate. The expansion factor was measured as described above. Again both measurements were made at neutral pH since the lens has been shown to be unaffected on the surface by pH. For these lenses, this ratio was found to be 1.023. The coating surface exhibited an RMS (root mean square) surface roughness of 23.6±6.9 nm and there were no coating defects (uncoated areas) observed greater than 4 $\mu$m.

A one-week clinical study was carried out on these coated lenses. The study was a one week contralateral extended wear study with the lens from Example 4 as the predicate lens. The clinical findings indicate that the PAA coated lens was statistically improved over the Example 4 in the areas of comfort, grittiness, dryness, wettability, and discrete deposits over the one-week study.

This example indicates that a PAA coated lens with an increased coating thickness and an increased expansion factor improved the performance of the lens.

Example 6

(Comparative): Physical Defect Profile

Monodisperse polystyrene spheres were adsorbed to the surface of dried lens substrates made according to Example 2 prior to coating to create coating defects. The microspheres used to create coating defects in this experiment had diameters of 0.5 $\mu$m, 6 $\mu$m, 20 $\mu$m, and 45 $\mu$m. The dried substrates were then coated using N,N-dimethacrylamide (DMA) plasma vapor deposition. Briefly the dried lenses were placed onto a tray (concave up), put into a plasma chamber, and subjected to 2 minutes continuous wave Argon plasma at 50 W and 200 mTorr. After removing the Argon DMA vapor was released into the chamber to a pressure of 200 mTorr. The vapor was allowed to react with the surface for 5 min. The lenses were then removed from the chamber, flipped over, and the other side was coated. The lenses were then hydrated in a borate buffered saline solution. After coating, the microspheres were removed by rubbing in OptiFree® solution for 30 sec with clean, bare fingers and then rinsed thoroughly with OptiFree® and borate buffered saline packing solution. Defects were confined to front surface on one set of lenses and the back surface on a separate set to isolate the differences in performance. The approximate defect density for each size of microsphere was as follows:

| Microsphere Diameter | Defect area per lens (cm³) |
|---|---|
| 45 $\mu$m | 6.9 × 10⁻³ |
| 20 $\mu$m | 2.0 × 10⁻³ |
| 6 $\mu$m | 2.1 × 10⁻³ |
| 0.5 $\mu$m | 1.3 × 10⁻³ |

The lens coatings were then analyzed for the presence of defects by Atomic Force Microscopy using a Digital Instruments Dimension 3100 AFM. Images were acquired with contact mode AFM using a 0.06 N/m $SiN_4$ cantilever imaging in packing solution. Imaging force was minimized before data was acquired and was typically <10 nN. Image sizes ranged from 20×20 to 90×90 $\mu$m areas, within the optical zone, on the anterior surface of each lens. Sufficient images were acquired for each lens type to find at least 4 defects so an average defect size for each lens type could be reported. Surface roughness parameters, root mean square (RMS) and peak to peak, were calculated using four 10×10 $\mu$m defect free areas from the images of each defect lens type. Roughness parameters for the defect free DMA coated surface were calculated from 12 10×10 $\mu$m areas.

Mean defect diameters and depths are tabulated below, along with the roughness parameters for each surface. Roughness parameters are mean values with standard deviations in parentheses.

| Microsphere Size | RMS (nm) | Peak to Peak (nm) | Diameter ($\mu$m) | Depth (nm) |
|---|---|---|---|---|
| No defects | 4.6 (0.6) | 47 (16) | N/A | N/A |
| 0.5 $\mu$m | 5.4 (0.8) | 94 (25) | 0.6 (0.1) | 29 (3) |
| 6 $\mu$m | 3.8 (0.1) | 69 (16) | 4.6 (0.2) | 17 (8) |
| 20 $\mu$m | 4.5 (0.6) | 61 (7) | 12.4 (2.1) | 20 (4) |
| 45 $\mu$m | 4.3 (3.2) | 54 (42) | 25.5 (3.3) | 12 (4) |

Clinical studies were carried out for coated lenses having each of the physical defect profiles. The study was comprised of two populations: a front surface defect group and a back surface defect group. Each lens type was worn bilaterally for 30-minutes. The front surface defect population consisted of five subjects (10 eyes) who wore all five-lens types. The back surface defect population consisted of five different people, but three of these subjects could not wear the 25.5 $\mu$m back surface defect lenses due to excessive corneal staining with the 12.4 $\mu$m back surface defect lenses.

| Defect size | none | 0.6 $\mu$m | 4.6 $\mu$m | 12.4 $\mu$m | 25.5 $\mu$m |
|---|---|---|---|---|---|
| Front Surface defect Group | 10 | 10 | 10 | 10 | 10 |
| Back Surface defect Group | 10 | 10 | 10 | 10 | 4 | n = number of eyes

The front and back surface groups were separate populations. The data are presented in paired fashion for convenience.

A Summary of the significant clinical findings are listed below:

Comfort: Significant decrease seen at the 12.4 $\mu$m back surface defect size.
Dryness: Trend toward increased dryness with all front surface defect lenses.
Grittiness: Significant decrease seen at the 12.4 $\mu$m back surface defect size.
Corneal staining: Significant increase seen at the 12.4 $\mu$m back surface defect level.
Wettability: Trend for the 25.5 $\mu$m front surface defect lenses to have a decrease tear break-up time.
Front surface discrete deposits: Significant increase seen with the 4.6, 12.4 and the 25.5 $\mu$m front surface defect lenses.
Back surface discrete deposits: Significant increase seen with the 4.6, 12.4 and the 25.5 $\mu$m back surface defect lenses.

This example demonstrates that defects larger than 4.6 $\mu$m show increased surface deposition. More dramatic clinical negatives occur as the size of the defects increase beyond the 4.6 $\mu$m.

Example 7

(Comparative): Surface Roughness Profile

Steel contact lens mold inserts were roughened using Electrical Discharge Machining (EDM) and diamond tool lathing methods and lens molds were injection molded from these inserts. Lens substrates made from the crosslinked polymer lens of Example 4 were cast in these molds and coated with N,N-dimethylacrylamide (DMA) by vapor deposition as described in Example 6 (no microspheres were used in this experiment, however). Only front surfaces of the lenses were roughened. The surface roughness profile of the coated lens was then analyzed by Atomic Force Microscopy using a Digital Instruments Dimension 3100 AFM. Images were acquired with contact mode AFM using a 0.06 N/m $SiN_4$ cantilever imaging the front surface of the lenses in packing solution. Images were analyzed as described above.

Surface roughness parameters (over 10×10 $\mu$m area) for the lenses are listed in the following table.

| Sample | Roughness Method | RMS Roughness (nm) | | | Peak to Peak (nm) | | |
|---|---|---|---|---|---|---|---|
| | | Mean | Stdev | Median | Mean | Stdev | Median |
| 733709-FC | None | 5.0 | 1.2 | 5.4 | 81.5 | 48.4 | 67.0 |
| 734909-FC | EDM | 66.4 | 30.7 | 68.5 | 371.6 | 132.7 | 337.5 |
| 733809-FC | EDM | 97.6 | 34.0 | 95.0 | 474.8 | 134.0 | 474.5 |
| 734009-FC | EDM | 157.8 | 38.0 | 153.5 | 705.3 | 201.9 | 664.0 |
| 734409-FC | Diamond | 213.4 | 96.9 | 198.5 | 782.8 | 82.7 | 784.0 |
| 734309-FC | Diamond | 255.4 | 42.4 | 253.5 | 1128.9 | 161.8 | 1092.15 |

Clinical studies were carried out for coated lenses having each of the surface roughness profiles. The results described below reflect a bilateral 30-minute clinical trial with various degrees of surface roughness generated via EDM and diamond tooling on the lens front surface.

Front surface deposition and wettability appear to be significantly altered by increased surface roughness at the 664-nm level (median peak to peak) and above. Vision was significantly reduced with every level of roughness as compared to the control.

More specifically, the following clinical performance was observed.

1. Deposition: Increasing roughness from 664-nm up increased front surface discrete and film deposition.
2. Wettability: Increasing roughness from 664-nm up had significantly reduced PLTF-NIBUT (pre-lens tear film non-invasive break up time—the time it takes for the tear film covering the front of the lens to collapse when the patient is not blinking. It can be construed as an in vivo measurement of the lens wettability). A discrete ledge at the optic zone junction (where the roughness was generated) in the lenses from 337.5 to 664.0-nm may artificially decrease the wettability; however, there is a trend for reduced PLTF-NIBUT with in the series with the ledge (337.5–664.0-nm). In addition, the two lens types with roughness created with the diamond tools (no visible ledge observed with the slit lamp) were significantly reduced as compared to the control. A substantial number of the 474.5 nm and greater lenses displayed a ground glass (frosted glass) look to the tear film. This phenomenon was on the front surface only, it appeared in patches or bands and typically covered 30–70% of the roughened surface. Upon blinking, the tear film would return to normal for a few seconds but quickly becomes "frosted" again.

3. Vision: Decreased to unacceptable levels with all test lenses as compared to the control. This example shows that increasing surface roughness of the front lens surface affects the clinical performance of the lens. Lenses with peak to peak surface roughness less than 475 nm had good clinical performance in all areas except vision. The type of roughness also affects the vision—the random roughness made by the EDM caused a severe reduction in vision while the circularly symmetric diamond lathe roughness did not cause a such a strong vision reduction.

Example 8

(Comparative): Coating Non-Uniformity

A lens substrate was prepared as described in Example 2. The lens was coated using polyacrylic acid (PAA) as described in Example 3. AFM analysis of the coated lens surface showed dramatic folds. The coating expansion factor was calculated as described previously by comparing the actual surface area of the coated article with the corresponding surface area of the uncoated lens. The data was acquired at pH 7.2 since the lens surface was found to be unaffected by pH. The resulting expansion factor was determined to be 1.026. In addition, the coating surface exhibited a mean RMS (root mean square) surface roughness of 16 (0.2) nm. In this case, however, several areas greater than 4 $\mu$m on the surface of these lenses were found to be lightly or virtually uncoated.

Clinical studies were carried out for the coated lenses prepared as described herein. The clinical studies were conducted as a one-week daily wear trial. This coated lens was found to have unacceptable clinical performance, with over 25% of the lenses having mild or moderate discrete deposition at the one-week visit. In addition, the lens had higher levels of corneal epithelium disruption (corneal staining max type>Grade 2) than what would be considered acceptable clinical performance.

This example demonstrates poor physiological compatibility in lenses having coating defects larger than 4.6 $\mu$m.

We claim:

1. A method of coating a contact lens comprising:
   a) selecting a lens substrate material,
   b) selecting a coating material which will have an expansion factor greater than one relative to the lens substrate material, and
   c) coating said lens substrate material with said coating material.

2. The method of claim 1 wherein the coated surface has no defects greater than 4.6 $\mu$m.

3. The method of claim 2 wherein the coated surface has no defects greater than 0.5 $\mu$m.

4. The method of claim 1 wherein the coated surface has a peak to peak roughness less than 475 nm over any 10×10 $\mu$m area of the coating.

5. The method of claim 1 wherein the lens substrate is a polymer made from a hydrophobic monomer.

6. The method of claim 5 wherein the lens substrate is a silicone-based polymer, oligomer, or macromer hydrogel.

7. The method of claim 1 wherein the coating comprises a hydrophilic material.

8. The method of claim 1 further comprising adhering said coating to said substrate with a tielayer.

9. The method of claim 1 further comprising adhering said coating to said substrate with a coupling agent.

10. The method of claim 7 wherein the coating is selected from the group consisting of poly(acrylic acid), poly (methacrylic acid), poly(itaconic acid), poly(maleic acid), block or random copolymers of (meth)acrylic acid, acrylic acid, maleic acid, itaconic acid with a reactive vinyl monomer, carboxymethylated polymers, polyacrylamide, polydimethacrylamide, poleyvinylalcohol, cellulose, dextran, polyethylene oxide, polyHEMA, poly sulfonates, polysulfates, polylactate, polyglycolic acid, other polyamines, and mixtures thereof.

11. The method of claim 1 wherein the substrate is a silicon-based polymer, oligomer, or macromer hydrogel, and the coating is a polyacrylic acid, polyacrylate, or mixtures thereof.

12. The method of claim 1 wherein the substrate is a silicon-based polymer, oligomer or macromer hydrogel, and the coating is block or random copolymers of (meth)acrylic acid, carboxymethylated polymers, polyacrylamide, polydimethylacrylamide, polyethylene oxide, polyhema poly sulfonates, polysulfates, or mixtures thereof.

13. The method of claim 1 wherein said coating step is conducted via aqueous solution.

14. The method of claim 1 wherein said coating step is conducted via organic borne solution.

15. The method of claim 1 wherein said coating step is photoinitiated.

16. The method of claim 1 wherein said coating step is initiated with ionizing radiation.

17. A method of selecting contact lenses wherein the lenses are lens substrates which are surface coated, said method comprising:
   a. coating a hydrophobic lens substrate with a hydrophilic material having an expansion factor greater than one;
   b. determining the surface roughness profile of said coated lens;
   c. determining the physical defect profile of said coated lens; and
   d. selecting for use those lenses having a low surface roughness profile and a low physical defect profile.

18. The method of claim 17 wherein said selecting step is conducted by statistical sampling.

19. The method of claim 17 wherein said selecting step is continuous.

20. A method of manufacturing physiologically compatible contact lenses comprising:
   a. forming a lens substrate from a hydrophobic monomer,
   b. coating the lens substrate with a hydrophilic material having an expansion factor greater than one, and
   c. selecting for use those coated lenses having a low surface roughness profile and a low physical defect profile.

21. The method of claim 20 further comprising the step of discarding those contact lenses having greater than a low surface roughness profile and a low physical defect profile.

22. The method of claim 20 wherein said selecting step is conducted by statistical sampling.

23. The method of claim 20 wherein said selecting and discarding steps are conducted continuously.

24. A method of manufacturing physiologically compatible contact lenses comprising:
   a. forming a lens substrate from a silicone based polymer, oligomer, or macromer,
   b. coating the lens substrate with an acrylic polymer capable of an expansion factor greater than one, and
   c. selecting for use those coated lenses having a low surface roughness profile and a low physical defect profile.

25. A physiologically compatible contact lens that is produced by a method comprising
   a. forming a lens substrate from a silicone based polymer, oligomer, or macromer,
   b. coating the lens substrate with an acrylic polymer capable of an expansion factor greater than one, and
   c. selecting for use those coated lenses having a low surface roughness profile and a low physical defect profile.

26. The contact lens of claim 25 having a surface roughness profile of less than 475 nm over any 10×10 $\mu$m area of coating and no physical defects greater than 4.6 $\mu$m.

27. The contact lens of claim 25 wherein the acrylic polymer is selected from one or more members of the group consisting of poly(acrylic acid), poly(methacrylic acid), poly(itaconic acid), poly(maleic acid), block or random copolymers of (meth)acrylic acid, acrylic acid, maleic acid, itaconic acid with a reactive vinyl monomer, carboxymethylated polymers, polyacrylamide, polydimethacrylamide, polyvinylalcohol, cellulose, dextran, polyethylene oxide, polyhema, poly sulfonates, olysulfates, polylactate, polyglycolic acid, other polyamines, and mixtures thereof.

* * * * *